H. W. DAVIS.
HEADLIGHT FOR AUTOMOBILES.
APPLICATION FILED JAN. 22, 1920.
1,369,885.
Patented Mar. 1, 1921.
2 SHEETS—SHEET 2.
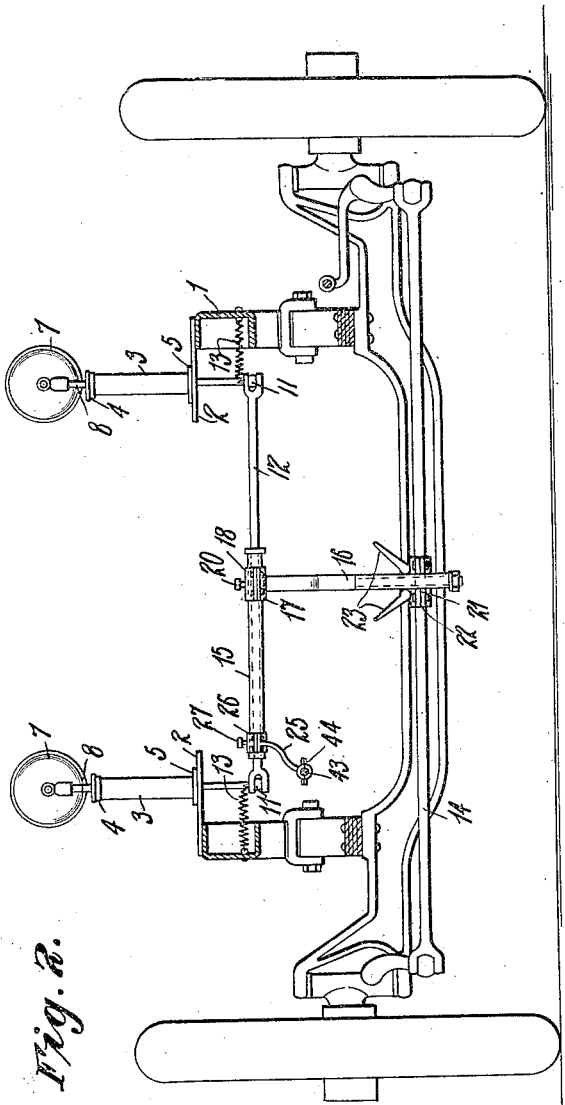
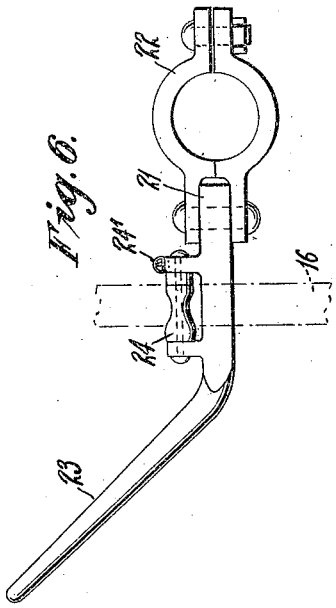
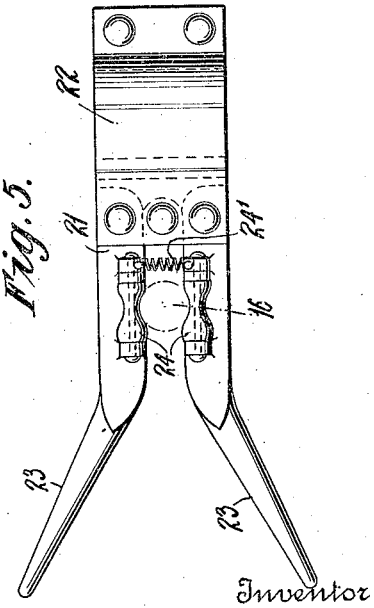
Inventor
H. W. Davis,
By
Attorney

UNITED STATES PATENT OFFICE.

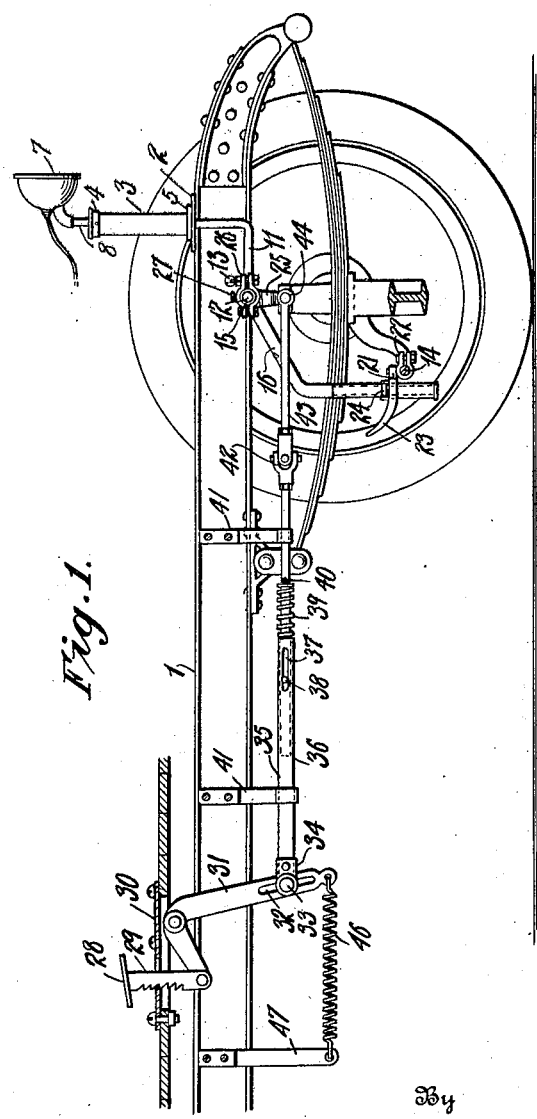

HARRY W. DAVIS, OF DANVILLE, ILLINOIS.

HEADLIGHT FOR AUTOMOBILES.

1,369,885.   Specification of Letters Patent.   Patented Mar. 1, 1921.

Application filed January 22, 1920. Serial No. 353,205.

*To all whom it may concern:*

Be it known that I, HARRY W. DAVIS, a citizen of the United States, residing at Danville, in the county of Vermilion and State of Illinois, have invented certain new and useful Improvements in Headlights for Automobiles, of which the following is a specification.

This invention relates to headlights for automobiles, and it relates particularly to that class in which the lights are automatically directed to the course to be taken by a moving vehicle on which they are mounted.

The object of the invention is to provide means for retaining and manipulating the headlight fixtures, of such construction that the lights shall be held and moved on an automobile in a manner to prevent undue jar to or difficulty in insuring the turning of the headlights to throw a light in the direction in which the front wheels of the vehicle are directed. A further object of the invention is to provide means under the convenient control of the driver of a car whereby the headlights may be connected to or disconnected from a portion of the steering mechanism of the car, permitting the headlights to be turned with the front wheels of the car, or to be maintained in position to cast lights from the front of a car in line with the body thereof.

Having these and other objects in view, the invention consists of the novel construction and combinations of the mounting, directing and connecting and disconnecting devices substantially as hereinafter described and claimed.

One form of embodiment of the invention is illustrated in the accompanying drawing, in which:

Figure 1 is a side view, partly in section, of the forward portion of the frame of an automobile, with my light mounting and controlling means applied thereto;

Fig. 2 is a front view of an automobile frame and a portion of the steering gear, showing the manner of mounting and moving headlights;

Fig. 3 is a detail sectional view, showing the means for supporting a headlight, and a portion of the means for controlling the position of the headlight;

Fig. 4 is a detail view partly in section of a portion of the means for detachably connecting the headlights with the steering gear of an automobile;

Fig. 5 is a plan view of a holder and guide designed to be connected to a portion of the steering gear and to receive a rod which forms a portion of the means for causing the lamps to move in unison with the front wheels of an automobile;

Fig. 6 is a side view of the holder and guide shown in Fig. 5; and

Fig. 7 is an elevation of a lever and sleeve forming part of the means for connecting and disconnecting the movable headlights to and from the steering mechanism.

In these drawings 1 represents a portion of the frame of an automobile and 2, 2 represent plates secured to each side of the frame and forming supports for the headlights. Attached to the plates 2 are cylinders 3, the inner faces of the detachable heads 4 and 5 whereof are provided with circular runways receiving anti-friction balls 6.

The headlights 7, which may be of any desired kind, are mounted upon standards 8 extending through the cylinders and having secured thereto disks 9 and 10. Each disk has formed on its outer face a circular groove corresponding in diameter to the runways in the heads of the cylinder, which grooves receive the anti-friction balls 6. The mounting thus formed insures the turning of the rods 8 and headlights by the application of slight force and without friction.

The lower ends 11 of the standards 8 extend at right angles to their main portions, and these ends are each pivotally connected to one end of a rod 12 extending transversely of the frame of the automobile, so that the longitudinal movement in either direction of the rod 12 will cause a corresponding turning of the standards and the headlights.

In order that the rod 12 may be caused to move in unison with a portion of the steering mechanism of the automobile, or to remain stationary and be held yieldingly in place by the coil spring 13, I provide a detachable connection between the rod and the cross steering bar 14. The form of connection herein shown consists of a sleeve 15 surrounding the rod 12 free to rotate thereon and incapable of independent longitudinal movement, and an arm 16. The upper end of the arm 16 has secured to it one portion 17 of a head which surrounds the sleeve 15, the other portion of the head being formed by the plate 18 bolted to the portion and clamping the sleeve. Projecting into the head is a set-screw 20, the inner end of which bears upon the sleeve securing the head and sleeve together.

The lower end of the arm 16 is connected to the cross steering bar 14 by a yoke 21, which, while permitting the parts to move up and down independently because of the action of the springs supporting the body of the automobile, will cause them to move longitudinally in unison. The yoke consists of a sectional collar 22 surrounding and secured to the bar 14, and the fingers 23 pivoted to the collar. Each finger is provided in its inner face with a roller 24 having a curved depression to receive the arm 16, and the fingers are normally held by a spring 24' to maintain the rollers in contact with the arm. In this way free up and down movement of the arm independently of the steering bar is permitted, while lateral movement of the bar is communicated to the arm 16 and the parts connected thereto. The removal of the arm from the fingers may be accomplished by the application of sufficient force to separate the jaws against the tension of the spring.

When the sleeve 15 is so positioned that the inner end of the arm 16 is held between the fingers 23, such a connection is established between the bar 14 and the headlights as to cause the latter to move with the shifting of the bar and to throw lights in whatever direction the front wheels of the car point. If the sleeve is turned to remove the arm 16 from the fingers 23 no movement will be communicated from the bar 14 to the rod 12 and the lamps, and the latter will be maintained by the opposing springs 13 in positions to throw light forward in line with the body of the car.

The manipulation of the sleeve 15 may be accomplished in any suitable way, and preferably for convenience it is governed by a driver of an automobile by a connection within his easy reach. The means herein shown consists of a lever 25 with which is formed a head 26 having an opening receiving the sleeve, and secured to the sleeve by a set-screw 27, a foot pedal and a connection between the foot pedal and the lever. The pedal 28 has a notched shank 29 which projects through a plate 30 secured to the floor of a car body, the notches being adapted to engage the plate to hold the shank in any position to which it may be depressed. The lower end of the shank is pivoted to one arm of a bell crank lever 31 pivoted to the floor 9 of the car, and the other end of the lever has in it a slot 32 receiving a pin 33 extending from a head 34. Attached to the head 34 is a sleeve 35 into which projects a slidable rod 36. The sleeve 35 has in it a slot 37 into which extends a pin 38 projecting from the rod 36, the movement of the rod in the sleeve being thus determined by the length of the slot. The connection formed by the sleeve 35 and the rod 36 is rendered resilient by means of a coil spring 39 surrounding the rod and bearing at one end against the end of the sleeve and at the other end against a stop 40 on the rod. The sleeve and the rod are supported by and free to move in hangers 41 depending from the frame 1 of the car. One end of a link 43 is connected by a universal joint 42 to the rod 36, and the other end of the link is connected to the lower end of the lever 25. As a convenient means for connecting the link 43 with the lever 25, the forward end of the link has formed with or attached to it a head 44 having in it a socket of a size and shape to receive a ball 45 on the lower end of the lever 25.

Attached at one end to the lower end of the bell crank lever 31 is a coil spring 46, the other end being attached to an arm 47 depending from the frame of the car.

The normal positions of the parts are such that a connection between the bar 14 of the steering mechanism and the headlights is maintained by reason of the location of the arm 16 between the fingers 23 of the yoke 21, insuring the turning of the lights on their supporting rods correspondingly with the front wheels of the car. The parts are yieldingly held in their normal positions by the action of the spring 46, which is constantly under tension. The depression of the pedal will, through the described connections, rotate the sleeve to swing the arm 16 to free it from the fingers 23, thus permitting lateral movement of the bar 14 without rotating the headlights. The parts may be held in disconnected positions by causing the plate 30 to engage one of the notches in the shank 29. A release of the shank permits the spring 46 to operate, through the bell crank lever, the lever 25, and their connections to rotate the sleeve 15, bringing it to its normal position, and to hold the parts in place to insure the automatic directing of the headlights.

I claim:

1. Means for mounting and controlling the headlights of an automobile comprising rotatable standards for supporting the headlights, a rod connecting the standards, a rotatable sleeve surrounding the rod, an arm rigidly connected at one end with the sleeve and detachably connected at its other end with a moving part of a steering gear, a pedal, and a connection between the pedal and the sleeve whereby as the pedal is moved the sleeve is rotated.

2. Means for mounting and controlling the headlights of an automobile comprising rotatable standards to which the headlights are attached, a rod connecting the standards, a movable bar constituting a portion of a steering gear, and a connection between the rod and the bar consisting of an arm movably connected at one end to the rod and detachably connected at the other end to the bar by separable spring-held jaws attached to the bar and provided on their meeting faces with rollers having grooves receiving the arm.

3. Means for mounting and controlling the headlights of an automobile comprising rotatable standards to which the headlights are attached, a rod connecting the standards, a rotatable sleeve arranged on the rod, a connection between the rod and a movable portion of a steering gear comprising an arm having a head attached to the sleeve, a lever connected to the sleeve, a pedal, and a connection between the pedal and the lever whereby by the movement of the pedal the sleeve is rotated.

4. Means for mounting and controlling the headlights of an automobile comprising rotatable standards to which the headlights are attached, a rod connecting the standards, a rotatable sleeve arranged on the rod, a connection between the rod and a moving portion of a steering gear comprising an arm rigidly connected at one end to the sleeve, and a detachable connection between the other end of the arm and such moving part of a steering gear, a pedal, a connection between the pedal and the sleeve, and a spring attached to the connection and tending to rotate the sleeve to bring the arm into contact with its detachable connection with the moving part of the steering gear.

5. Means for mounting and controlling the headlights of an automobile comprising rotatable standards for supporting the headlights, a rod connecting the standards, a rotatable sleeve surrounding the rod, an arm rigidly connected at one end with the sleeve and detachably connected at its other end with a moving part of a steering gear, a pedal, and a connection between the pedal and the sleeve whereby as the pedal is moved the sleeve is rotated, the connection between the pedal and the sleeve being yielding, whereby movement of the sleeve by reason of vibration or shocks to an automobile to which the device is attached is avoided.

In testimony whereof I affix my signature.

HARRY W. DAVIS.